UNITED STATES PATENT OFFICE.

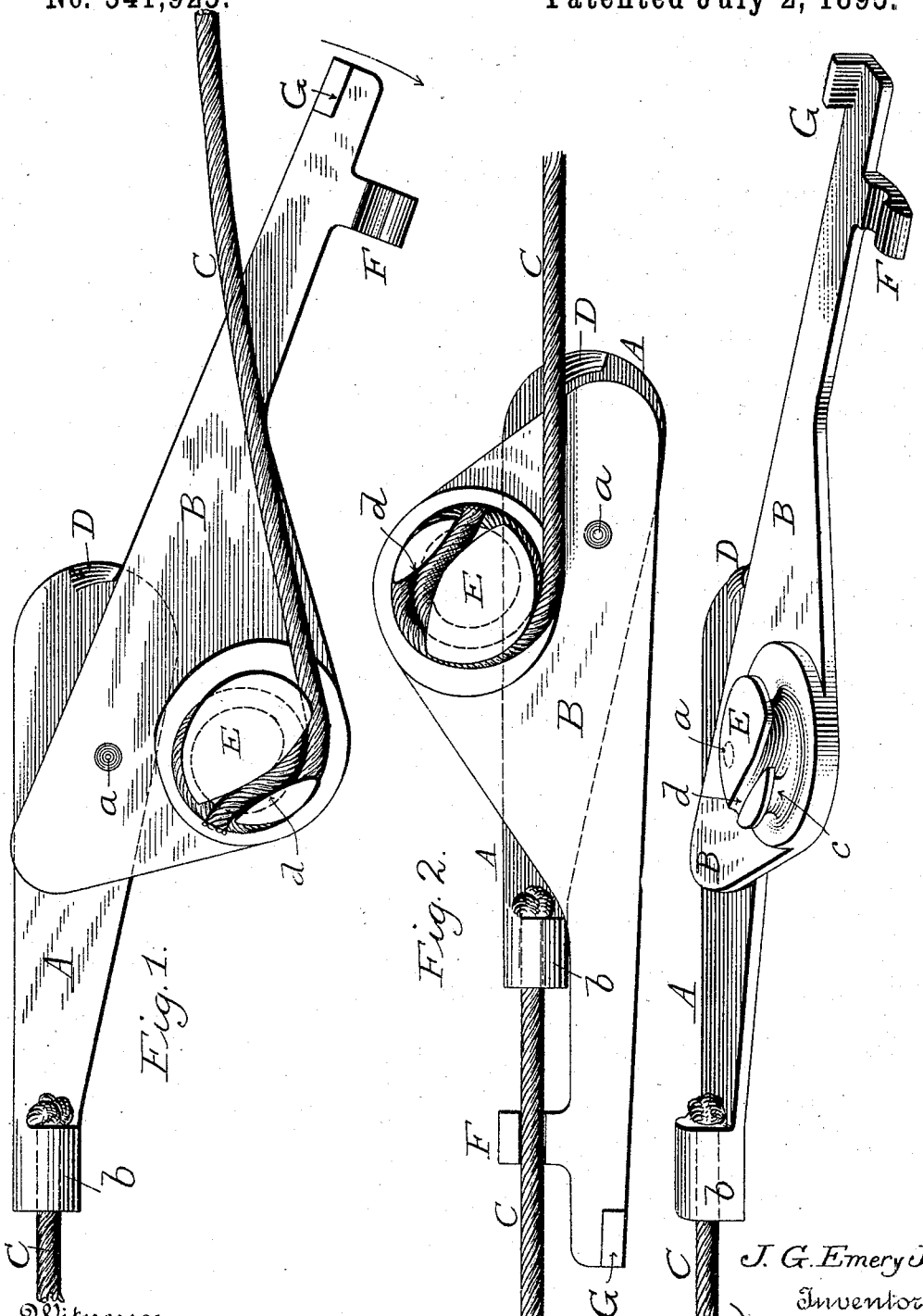

JOHN G. EMERY, JR., OF MUSKEGON, MICHIGAN.

CLAMP.

SPECIFICATION forming part of Letters Patent No. 541,925, dated July 2, 1895.

Application filed April 20, 1895. Serial No. 546,570. (No model.)

*To all whom it may concern:*

Be it known that I, JOHN G. EMERY, Jr., a citizen of the United States, residing at Muskegon, in the county of Muskegon and State of Michigan, have invented certain new and useful Improvements in Clamps, of which the following is a specification.

My invention relates to trunk, bale, and box clamps, the object and construction of which will be hereinafter set forth, reference being had to the annexed drawings, in which—

Figure 1 is a top plan view of the clamp in its initial position; Fig. 2, a similar view, showing the rope or band under tension, and clamped; and Fig. 3, a perspective view.

The object of my invention is to produce a simple and effective rope or band clamp or tie which may be readily used around boxes, trunks, bales, bundles and the like.

A represents a plate, to which is pivoted at $a$, a lever or arm B. The plate A is provided with a perforated lug or enlargement $b$ (or it may be a hole) at one end to receive one end of the chain, band, wire, or rope C, which is securely fastened therein. This enlargement also serves the function of a stop to limit the throw of lever B when the parts are in their clamped position, the edge of the lever B coming into contact therewith, as will be seen upon reference to Fig. 2. At the opposite end of plate A, there is formed a lug or stop D, which limits the distance which lever B may swing when the band is unclamped and the parts are in the position shown in Figs. 1 and 3.

E designates the winding stud or post formed upon arm or lever B, to one side of the pivot $a$. A groove or channel $c$ is formed around the post or stud, terminating in a cross channel or groove $d$. These channels or grooves will preferably be made V-shaped, though a curved or U-shaped recess may be used. The first construction, however, is preferred, as it binds or bites the band better. The groove $c$ is made deeper at that portion where the band wraps upon or comes into contact with itself, as shown by the dotted lines in Figs. 1 and 2, so that it cannot be accidentally loosened or displaced.

F indicates a grooved or curved lip formed upon the lever or arm B near its free end, at such a distance from the pivot that when the lever is swung into the position shown in Fig. 2, the lip will pass beyond the end of lever A and under the band, which finds a seat in its curved face. This lip being in approximately the same plane which the band occupies near the enlargement $b$, there is no tendency for the two parts A B to become disengaged when the band is under tension and once firmly seated. The lip is to resist the tendency of the tension of the line to lift the lever off the plate, since the point of attachment of the band to the winding stud is between the pivot and the lip.

The operation of my device is as follows: After the band has been passed about the article to be tied or bound, its free end is passed around the stud E in the channel $c$, and then across the stud in the cross groove $d$, as in Fig. 1. The operator then takes hold of the end of lever B and draws it around into the position shown in Fig. 2. During this operation the band is wound around the stud or post upon itself, binding the first coil firmly within the groove $c$ and at the same time taking up the slack in the line. The stud passes around the pivot from one side to the other so that when the band is under tension, its ends are in substantially the same line, with the pivot point to one side thereof, and there is no tendency for the arm or lever B to fly back and the band to unwind from the post E. It will thus be seen that the clamp is automatic in its locking action as soon as the ends of the rope are approximately in line and the pivot to one side thereof. When the band has been drawn taut, the clamp lies flat upon the article being bound so that the parts are not liable to be shifted and the clamp loosened. It is preferable, though not necessary, to provide means for readily unloosing the clamp, and to this end I form upon the outer end of the lever B, an upright extension or stud G. This will enable me to secure a firm grasp upon the lever when it is desired to unlock or release the rope.

Throughout this specification, and in the following claims, the term band is used in its broadest sense, and is intended to include a rope, chain, wire, or any analogous device.

Having thus described my invention, what I claim is—

1. A clamp comprising a plate and a lever pivoted together; a band fastened to the plate;

and means carried by the lever for holding the free end of the band and taking up the slack therein when the lever is turned upon the plate.

2. In a clamp, the combination of a plate having a band fastened thereto; a lever or arm pivoted to the plate; and means carried by the lever to clamp the free end of the band and take up the slack therein by the rotation of the lever.

3. A clamp comprising a plate having a band fastened thereto; a lever pivoted to the plate; and a winding post or stud carried by the lever.

4. A clamp comprising a plate having a band fastened thereto; a lever pivoted to the plate; a winding post or stud carried by the lever; and a lip also formed upon the lever.

5. A clamp comprising a plate, having a band securely fastened thereto, a lever pivoted to the plate; a winding post or stud carried by the lever, said post being provided with the circumferential groove $c$ and cross groove or channel $d$.

6. In a clamp, the combination with a plate and a band attached thereto; of an arm or lever pivoted to the plate and provided with a band attaching stud to one side of the pivot.

7. In a clamp, the combination with a plate and a band attached thereto; of an arm or lever pivoted on the plate and having means for securing the free end of the band; and a projection carried by the lever to engage the rope when the ends of the rope are brought into line.

In witness whereof I hereunto set my hand in the presence of two witnesses.

JOHN G. EMERY, Jr.

Witnesses:
A. J. SHAW,
T. C. AKIN.